(12) United States Patent
Kinsey et al.

(10) Patent No.: US 12,654,582 B2
(45) Date of Patent: Jun. 16, 2026

(54) SYSTEMS AND METHODS OF MODIFYING IDLE THRESHOLDS FOR CHARGING ELECTRIC VEHICLES

(71) Applicant: Volta Charging, LLC, San Francisco, CA (US)

(72) Inventors: Jeffrey Kinsey, San Francisco, CA (US); Alexandra Prodaniuk Carpenter, Pacifica, CA (US)

(73) Assignee: Volta Charging, LLC, San Francisco, CA (US)

( * ) Notice: Subject to any disclaimer, the term of this patent is extended or adjusted under 35 U.S.C. 154(b) by 96 days.

(21) Appl. No.: 18/564,566

(22) PCT Filed: Jun. 3, 2022

(86) PCT No.: PCT/US2022/032052
§ 371 (c)(1),
(2) Date: Nov. 27, 2023

(87) PCT Pub. No.: WO2022/271427
PCT Pub. Date: Dec. 29, 2022

(65) Prior Publication Data
US 2025/0229664 A1 Jul. 17, 2025

Related U.S. Application Data

(60) Provisional application No. 63/214,669, filed on Jun. 24, 2021.

(51) Int. Cl.
*G06Q 10/0631* (2023.01)
*B60L 53/65* (2019.01)

(52) U.S. Cl.
CPC .......... *B60L 53/65* (2019.02); *G06Q 10/0631* (2013.01); *B60L 2250/22* (2013.01)

(58) Field of Classification Search
None
See application file for complete search history.

(56) References Cited

U.S. PATENT DOCUMENTS

2018/0105051 A1* 4/2018 Zheng ................ G06Q 20/3276

FOREIGN PATENT DOCUMENTS

CA 3219135 A1 * 12/2022 .............. H02J 50/40
JP 2013186519 A * 9/2013

OTHER PUBLICATIONS

Anonymous, "Enjoy 2 Hours Free Parking When You Shop & Dine at Changi Airport T4 Public Area", URL:https://web.archive.org/web/202 10423023 102/https://www.changiairport.com/en/shop/promotions/free-parkine-promotion html. Apr. 23, 2021. 3 pgs (Year: 2021).*

(Continued)

*Primary Examiner* — Amanda Gurski
(74) *Attorney, Agent, or Firm* — Morgan, Lewis & Bockius LLP

(57) ABSTRACT

A method for charging an electric vehicle is performed at an electric vehicle charging station. The method includes determining that, a vehicle is occupying a bay of an electric vehicle charging station. The method further includes, identifying a user associated with the vehicle; allotting a charging parameter threshold for charging the vehicle and determining that the user is located within a predefined geographic area. The method includes, when the user is located within the predefined geographic area, increasing the charging parameter threshold from a first charging parameter threshold value to a second charging parameter threshold value.

13 Claims, 13 Drawing Sheets

(56)     References Cited

OTHER PUBLICATIONS

Anonymous, "Enjoy 2 Hours Free Parking When You Shop & Dine at Changi Airport T4 Public Area", URL:https://web.archive.org/web/20210423023102/https://www.changiairport.com/en/shop/promotions/free-parking-promotion.html, Apr. 23, 2021, 3 pgs.
Volta Charging, LLC, International Search Report and Written Opinion, PCT/US2022/032052, Oct. 21, 2022, 12 pgs.

* cited by examiner

Server System 120

302 —

CPU(s)

Memory 320

| Operating System 322 |
| Communication Module 324 |
| Web Browser 326 |
| Application Module 334 |
| Idle Fee Module 336 |
| Database 338 |

312 —

Communication interface(s) 310

EVCS
100

403
Motor

402
Sensor(s)

405
Controller

CPU(s)
404

416

Additional
Peripherals
406

Display(s)
210

Charging
Cable/Gun
102

Light
Source(s)
412

Communication
interface(s) 414

Memory 420

Operating System 422

Communications Module 424

Animations Module 426

Charging Module 428

Motor Control Module 434

Status Module 440

User Device 112

Memory 530

Operating System 532

Network Communication Module 534

User Interface Module 536

EVCS Application 538

Map Module 540

User Information Module 548

Maps Application 549

Web Browser Application 550

Other Applications 552

CPU(s) 502

504

User Interface 510

Output Device(s) 512

Audio Jack 514

Speaker 516

Display 511

Input Device(s) 518

Network Interface(s) 520

Figure 6B:
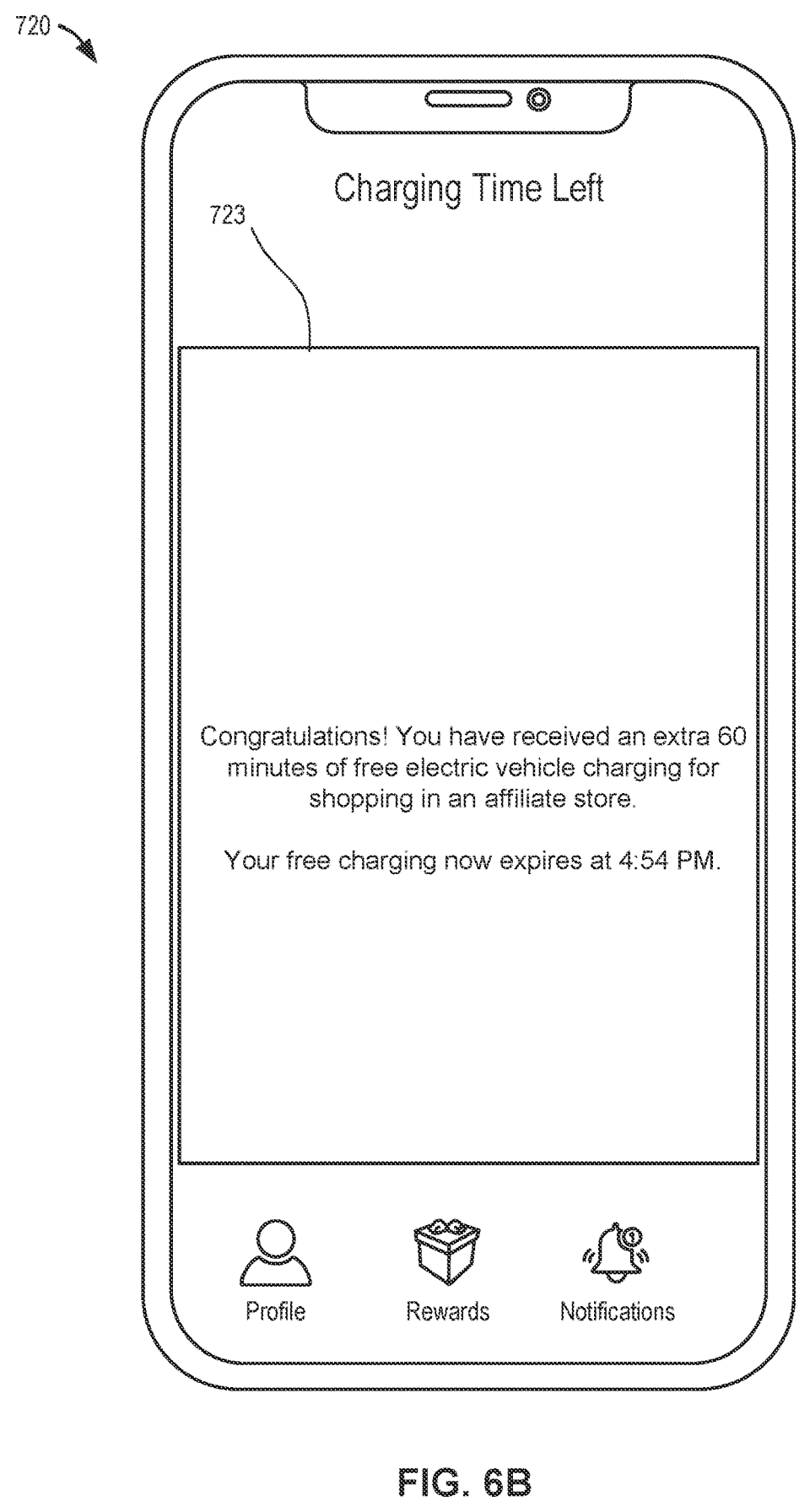

720

723

Charging Time Left

Congratulations! You have received an extra 60 minutes of free electric vehicle charging for shopping in an affiliate store.

Your free charging now expires at 4:54 PM.

Profile         Rewards         Notifications

Figure 7A:
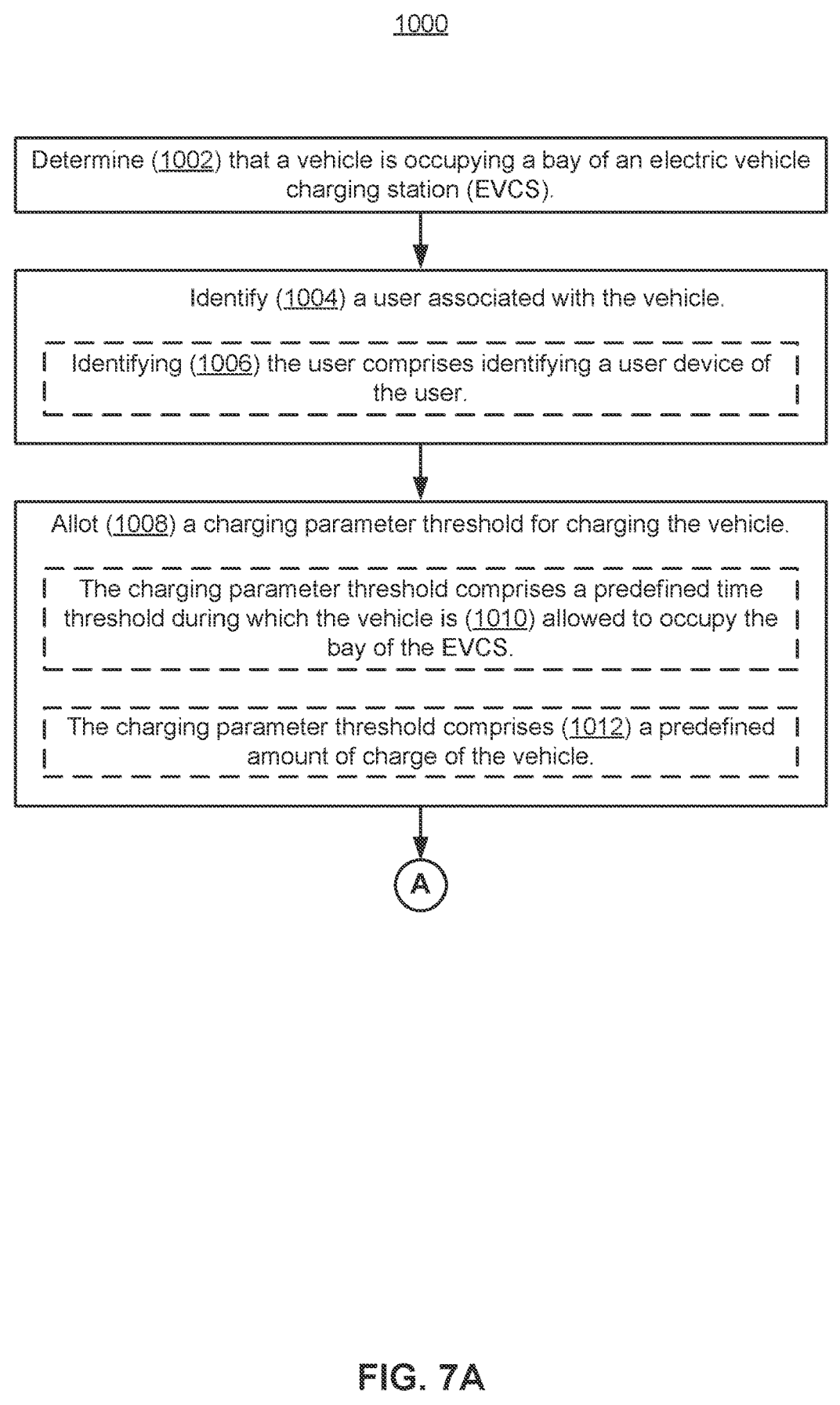

Determine (1002) that a vehicle is occupying a bay of an electric vehicle charging station (EVCS).

Identify (1004) a user associated with the vehicle.

Identifying (1006) the user comprises identifying a user device of the user.

Allot (1008) a charging parameter threshold for charging the vehicle.

The charging parameter threshold comprises a predefined time threshold during which the vehicle is (1010) allowed to occupy the bay of the EVCS.

The charging parameter threshold comprises (1012) a predefined amount of charge of the vehicle.

Determine (1014) that the user is located within a predefined geographic area.

Determining whether the user is in the predefined geographic area comprises using (1016) background indoor tracking.

Determining whether the user is in the predefined geographic area comprises determining (1018) whether a geofence at the predefined geographic area has been crossed.

Determining whether the user is in the predefined geographic area comprises determining (1020) whether a device associated with a user has detected a signal from a wireless access point that is transmitted from within the predefined geographic area.

Determining whether the user is in the predefined geographic area comprises determining (1022) whether a device associated with the user has detected a signal from a BLE beacon that is located within the predefined geographic area.

Determining whether the user is in the predefined geographic area comprises determining (1024), using a store purchase system, whether the user has completed a transaction within the predefined geographic area.

FIG. 7B

Determine (1014) that the user is located within a predefined geographic area.

Determining whether the user is in the predefined geographic area comprises tracking (1026) the user.

The predefined geographic area is (1028) associated with a site-partner of the EVCS.

In accordance with a determination that the user is located within the predefined geographic area, increase (1030) the charging parameter threshold from a first charging parameter threshold value to a second charging parameter threshold value.

While the vehicle is occupying the bay of the EVCS, determine (1032) that the vehicle has satisfied extension criteria, wherein the charging parameter threshold is increased in accordance with a determination that the vehicle has satisfied extension criteria.

The charging parameter threshold is increased (1034) by an amount that is based on an identification of the predefined geographic area.

Transmit (1036), to the user, an alert indicating that the charging parameter threshold has increased.

FIG. 7C

In accordance with a determination that the user is not located within the predefined geographic area, maintain (1038) the charging parameter threshold.

After increasing the charging parameter threshold:

determine (1040) that the vehicle has satisfied second extension criteria; determining that the user continues to be located within the predefined geographic area;

in accordance with a determination that the user continues to be located within the predefined geographic area and that the vehicle satisfies the second extension criteria, increase the charging parameter threshold from the second charging parameter threshold value to a third charging parameter threshold value.

FIG. 7D

SYSTEMS AND METHODS OF MODIFYING IDLE THRESHOLDS FOR CHARGING ELECTRIC VEHICLES

CROSS REFERENCE TO RELATED APPLICATION

This Application is a United States National Stage Application filed under 35 U.S.C. § 371 of PCT Patent Application Serial No. PCT/US2022/032052 filed on Jun. 3, 2022, which claims the benefit of and priority to U.S. Patent Application No. 63/214,669 filed on Jun. 24, 2021, each of which is hereby incorporated by reference in its entirety.

TECHNICAL FIELD

This application relates generally to electric vehicle charging stations and, more particularly, to determining idle fee thresholds and extending the idle fee thresholds based on a user's geographical location.

BACKGROUND

Electric vehicles (EVs) are growing in popularity, largely due to their reduced environmental impact and lack of reliance on fossil fuels. As the number of EVs increases, there will be a corresponding need to expand supporting infrastructure, and in particular, a need for vastly more electric vehicle charging stations (EVCS). Moreover, because EVCS can be placed, e.g., in parking lots and on the street, the availability of electric vehicle charging stations will play an increasingly significant role in driver's decisions about where to travel.

Conventional methods and user interfaces within electric vehicle charging station mobile applications are designed and implemented as a replacement for traditional gasoline fueling rather than being a secondary benefit of the establishment being visited. Thus, such methods and interfaces include very little information about, or control over, charging time and idle fees incurred if a vehicle were to exceed the charging time limit set on the electric vehicle charging station.

SUMMARY

The disclosed implementations provide systems (e.g., server systems and client devices) and methods of charging a vehicle at an electric vehicle charging station (EVCS) by allotting a charging expiration time to a user for charging a vehicle and increasing the charging parameter threshold from a first value to a second value in response to the user being located in a predefined geographic area. For example, in some circumstances, retailers and other commercial enterprises may incentivize people to frequent their location by providing free electric vehicle charging. Unfortunately, free electric vehicle charging also attracts drivers who have no intention of visiting the commercial enterprise that provided the charging station. In addition, unless some sort of penalty is incurred, drivers may leave their vehicles at the electric vehicle charging stations far longer than necessary, essentially using the electric vehicle charging station as an ordinary parking spot. This reduces the availability of electric vehicle charging stations as a whole, and limits the effect of the incentive. For this reason, idle fees are often applied when a vehicle remains in a bay of an electric vehicle charging station in excess of a threshold.

It is desirable, however, to allow patrons of the commercial establishments that provide the electric vehicle charging to leave their vehicles in a bay of an electric vehicle charging station for longer than non-patrons.

To that end, in accordance with some implementations, a method is performed for charging a vehicle at an electric vehicle charging station. The method includes determining that a vehicle is occupying a bay of an EVCS, identifying a user associated with the vehicle, allotting a charging parameter threshold for charging the vehicle and determining that the user is located within a predefined geographic area. The method includes, when the user is located within the predefined geographic area, increasing the charging parameter threshold from a first charging parameter threshold value to a second charging parameter threshold value.

Some implementations of the present disclosure provide a computer system (e.g., a server system), comprising one or more processors and memory storing one or more programs. The one or more programs store instructions that, when executed by the one or more processors, cause the computer system to perform any of the methods described herein.

Some implementations of the present disclosure provide a computer program product (e.g., a non-transitory computer readable storage medium storing instructions) that, when executed by a computer system having one or more processors, cause the computer system to perform any of the methods described herein.

BRIEF DESCRIPTION OF THE DRAWINGS

For a better understanding of the various described implementations, reference should be made to the Detailed Description below, in conjunction with the following drawings in which like reference numerals refer to corresponding parts throughout the figures.

FIG. 6B illustrates different aspects of a user interface for an electric vehicle charging station mobile application, in accordance with some implementations.

FIGS. 7A-7D illustrate a flowchart of a method of determining idle fee thresholds and extending the idle fee thresholds based on a user's geographical location, in accordance with some implementations.

DETAILED DESCRIPTION

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

Many modifications and variations of this disclosure can be made without departing from its spirit and scope, as will be apparent to those skilled in the art. The specific implementations described herein are offered by way of example only, and the disclosure is to be limited only by the terms of the appended claims, along with the full scope of equivalents to which such claims are entitled.

Figure 1:
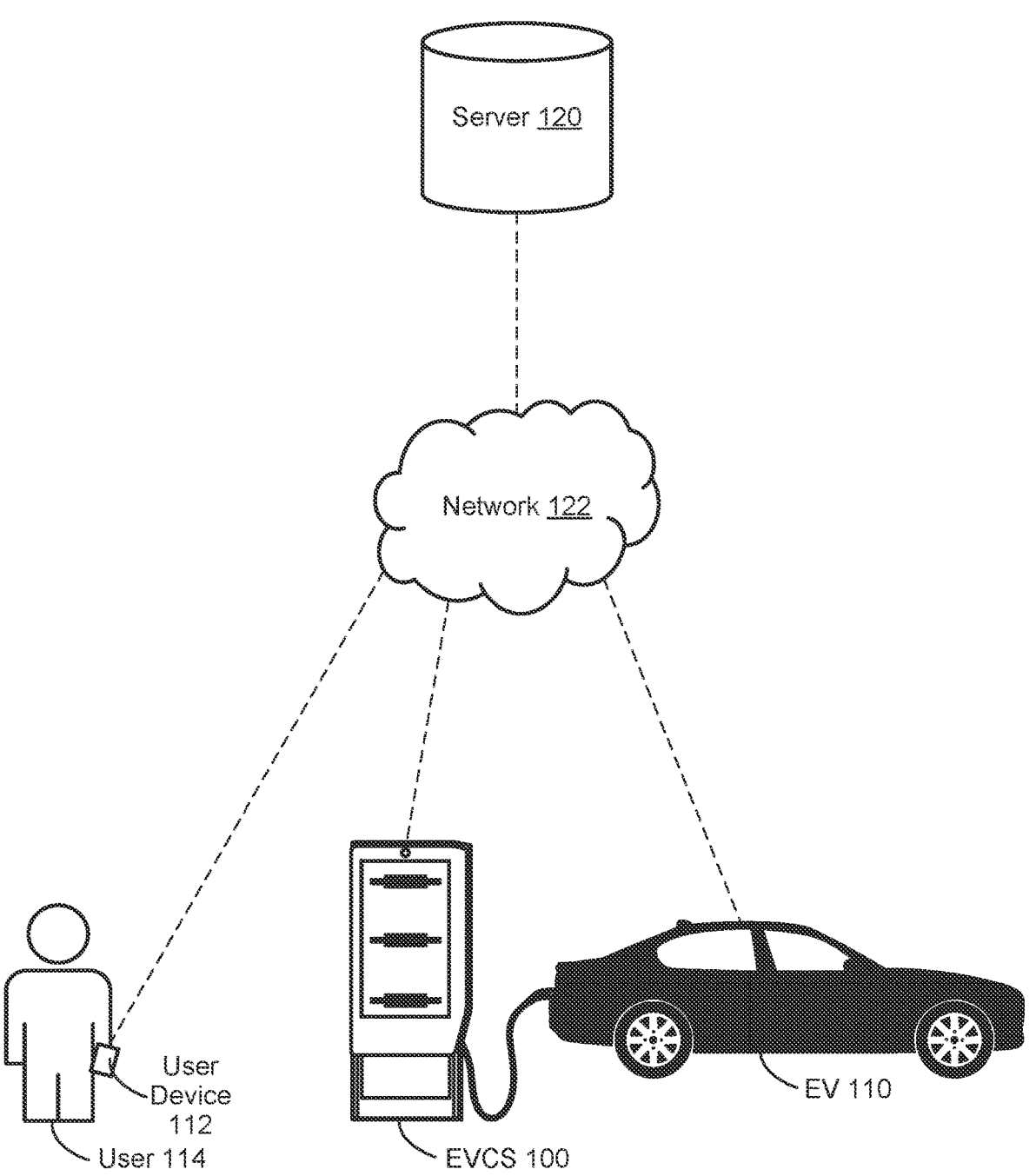
FIG. 1 illustrates a system for charging an electric vehicle in accordance with some implementations.

FIG. 1 illustrates an electric vehicle charging station (EVCS) 100 that is configured to provide an electric charge to an electric vehicle 110 via one or more electrical connections. In some implementations, the EVCS 100 provides an electric charge to electric vehicle 110 via a wired connection, such as a charging cable. Alternatively, the EVCS 100 may provide an electric charge to electric vehicle 110 via a wireless connection (e.g., wireless charging). In some implementations, the EVCS 100 may be in communication with the electric vehicle 110 or a user device 112 belonging to a user 114 (e.g., a driver, passenger, owner, renter, or other operator of the electric vehicle 110) that is associated with the electric vehicle 110. In some implementations, the EVCS 100 communicates with one or more devices or computer systems, such as user device 112 or server system 120, respectively, via a network 122.

Figure 2A:
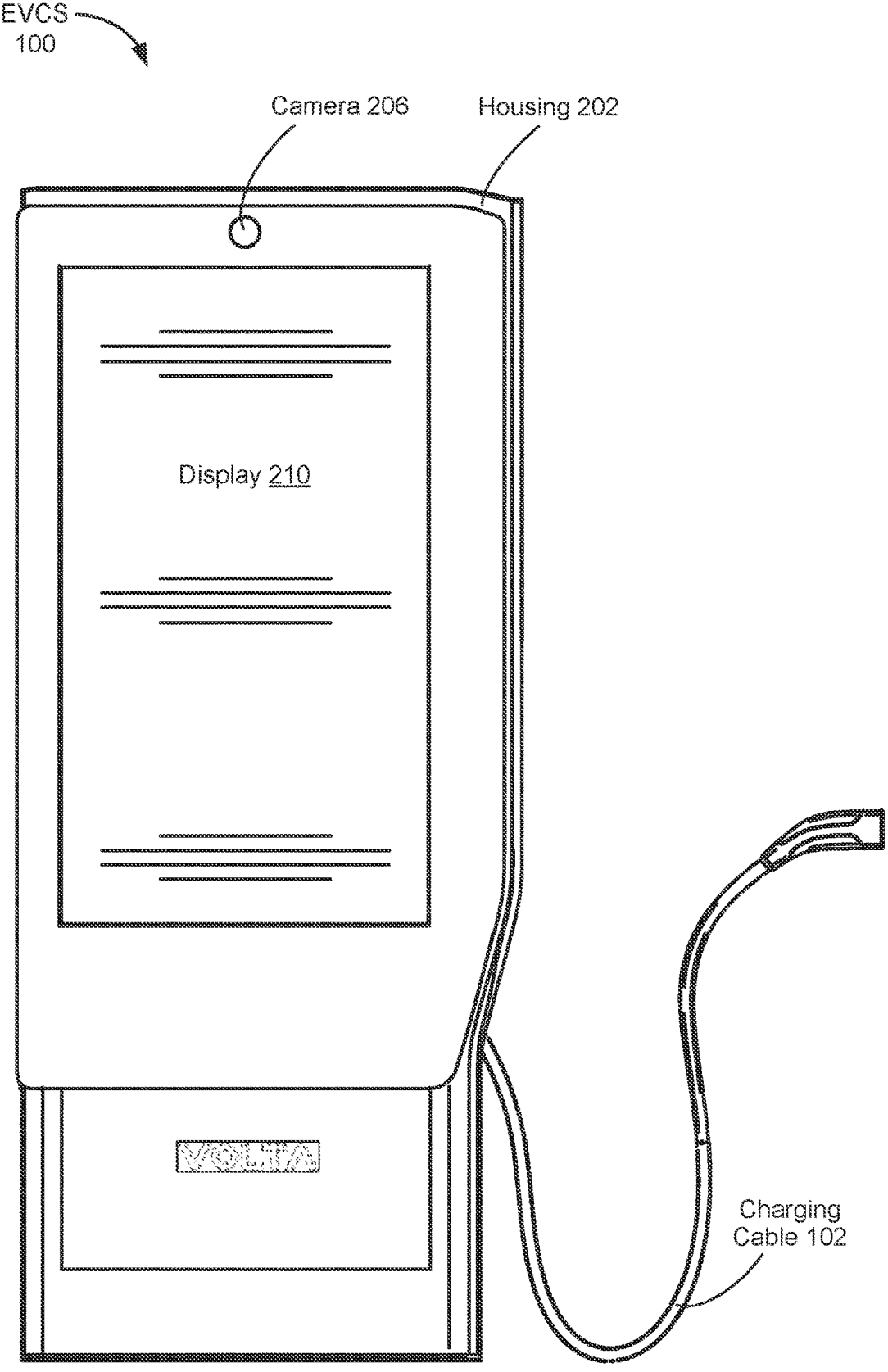
FIGS. 2A-2C illustrate a charging station for an electric vehicle in accordance with some implementations.
Figure 2B:
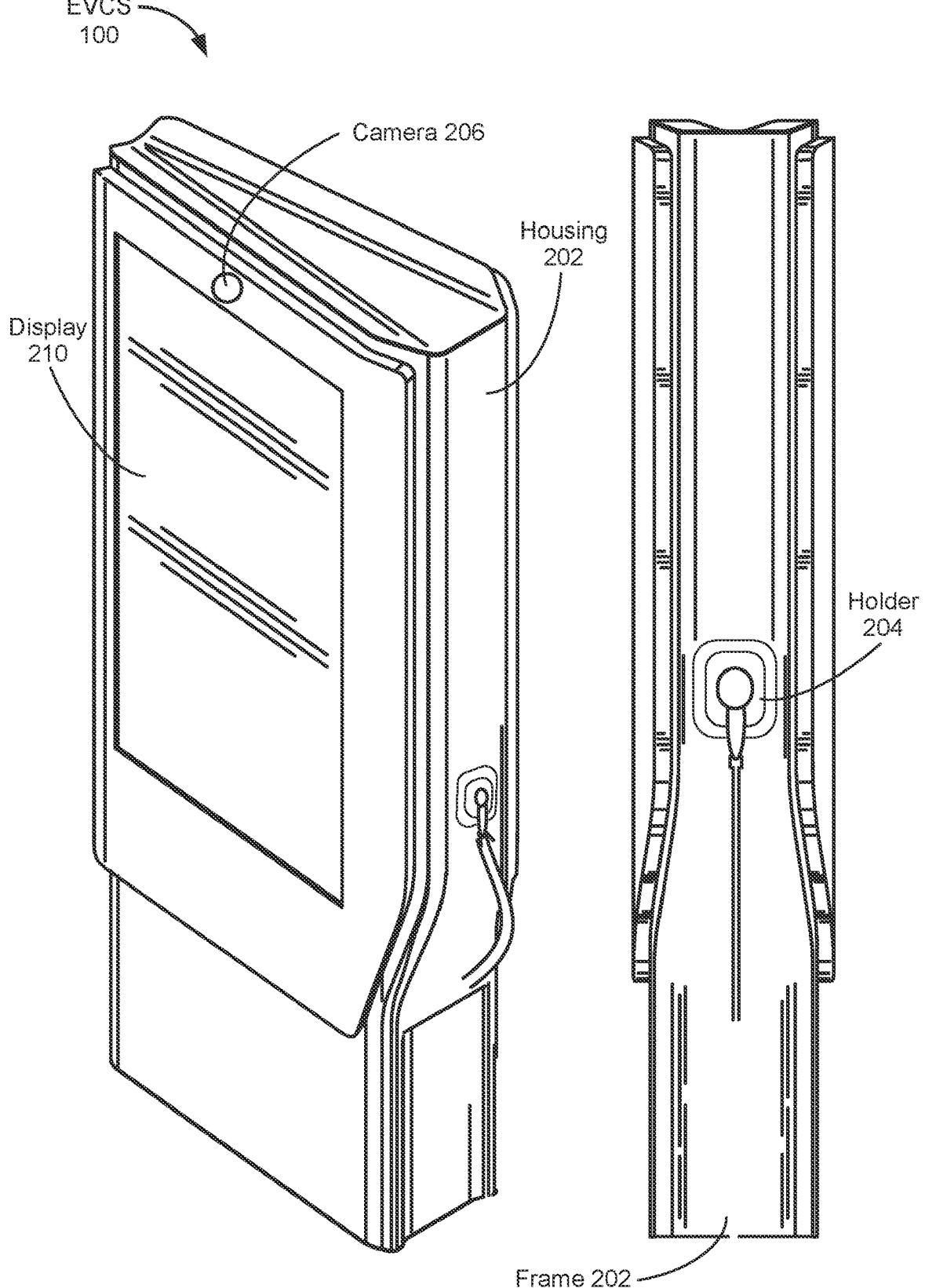
Figure 2C:
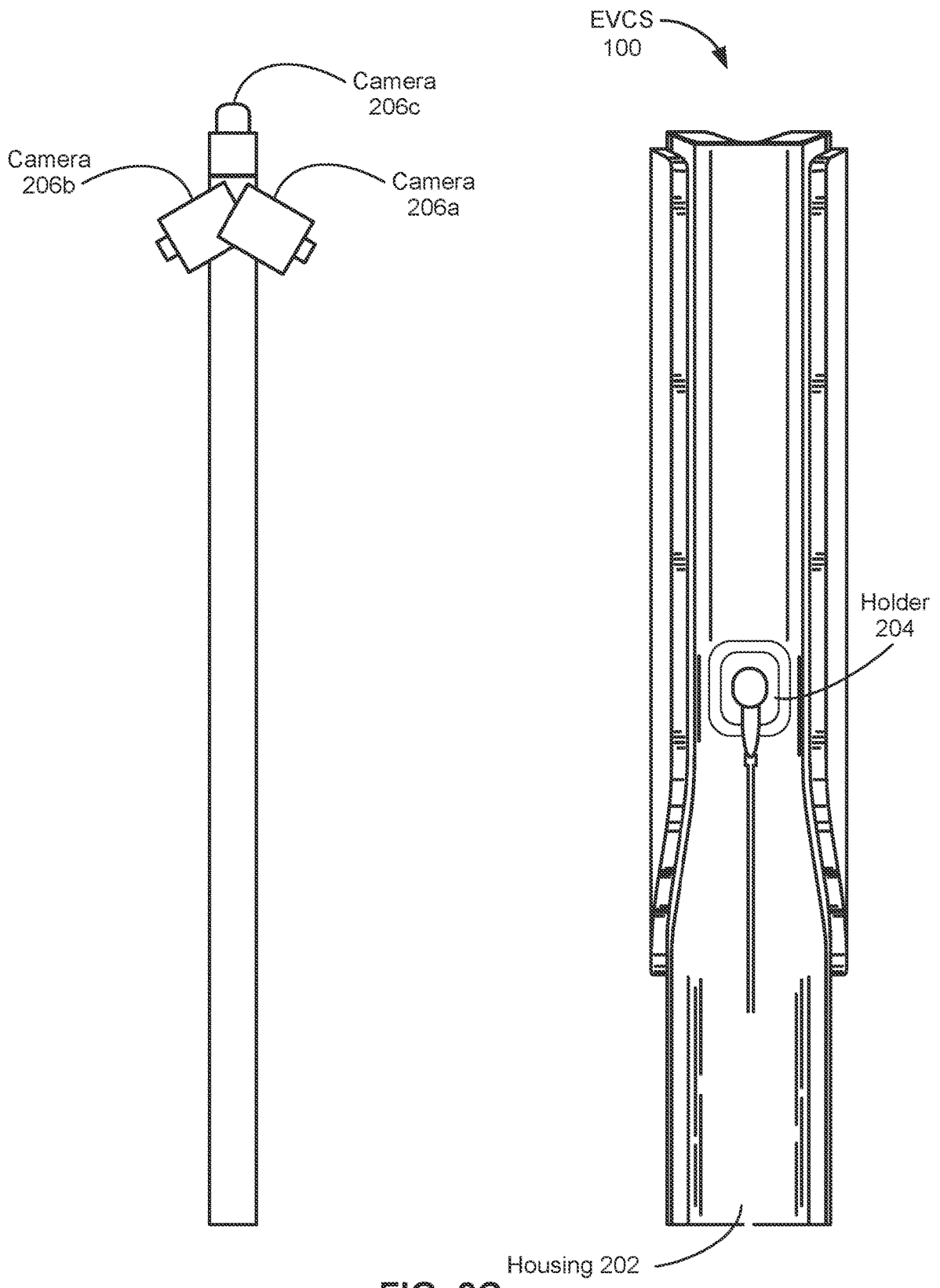

FIG. 2A is a mechanical drawing showing various views of an electric vehicle charging station (EVCS) 100, in accordance with some implementations. FIG. 2B is a mechanical drawing showing additional views of the EVCS 100 of FIG. 2A, in accordance with some implementations. FIG. 2C shows an alternative configuration of EVCS 100, in accordance with some implementations. FIGS. 2A-2C are discussed together below.

EVCS 100 includes a housing 202 (e.g., a body or a chassis) including a charging cable 102 (e.g., connector) configured to connect and provide a charge to an electric vehicle 110 (FIG. 1). An example of a suitable connector is an IEC 62196 type-2 connector. In some implementations, the connector is a "gun-type" connector (e.g., a charge gun) that, when not in use, sits in a holder 204 (e.g., a holster). In some implementations, the housing 202 houses circuitry for charging an electric vehicle 110. For example, in some implementations, the housing 202 includes power supply circuitry as well as circuitry for determining a state of a vehicle being charged (e.g., whether the vehicle is connected via the connector, whether the vehicle is charging, whether the vehicle is done charging, etc.).

The EVCS 100 further includes one or more displays 210 facing outwardly from a surface of the EVCS 100. For example, the EVCS 100 may include two displays 210, one on each side of the EVCS 100, each display 210 facing outwardly from the EVCS 100. In some implementations, the one or more displays 210 display messages (e.g., media content) to users of the charging station (e.g., operators of the electric vehicle) and/or to passersby that are in proximity to the EVCS 100. In some implementations, each of the displays 210 are on a respective panel that has a height that is at least 60% of a height of the housing 202 and a width that is at least 90% of a width of the housing 202. In some implementations, the panel 102 has a height that is at least 3 feet and a width that is at least 2 feet.

In some implementations, the EVCS 100 includes one or more panels that hold a display 210. The displays are large compared to the housing 202 (e.g., 60% or more of the height of the frame and 80% or more of the width of the frame), allowing the displays 210 to function as billboards, capable of conveying information to passersby. In some implementations, the displays 210 are incorporated into articulating panels that articulate away from the housing 202 (e.g., a sub-frame). The articulating panels solve the technical problem of the need for maintenance of the displays 210 (as well as one or more computers that control content displayed on the display). To that end, the articulating panels provide easy access to the entire back of the displays 210. In addition, in some implementations, the remaining space between the articulating panels (e.g., within the housing 202) is hollow, allowing for ample airflow and cooling of the displays 210.

The EVCS 100 further includes a computer that includes one or more processors and memory. The memory stores instructions for displaying content on the display 210. In some implementations, the computer is disposed inside the housing 202. In some implementations, the computer is mounted on a panel that connects (e.g., mounts) a first display (e.g., a display 210) to the housing 202. In some implementations, the computer includes a near-field communication (NFC) system that is configured to interact with a user's device (e.g., user device 112 of a user 114 of the EVCS 100).

In some implementations, the EVCS 100 includes one or more sensors (not shown) for detecting whether external objects are within a predefined region (area) proximal to the housing. For example, the area proximal to the EVCS 100 includes one or more parking spaces, where an electric vehicle 110 parks in order to use the EVCS 100. In some implementations, the area proximal to the EVCS 100 includes walking paths (e.g., sidewalks) next to the EVCS 100. In some implementations, the one or more sensors are configured to determine a state of the area proximal to the EVCS 100 (e.g., wherein determining the state includes detecting external objects). The external objects can be living or nonliving, such as people, kids, animals, vehicles, shopping carts, (kids) toys, etc. The one or more sensors can detect stationary or moving external objects. The one or more sensors of the EVCS 100 include one or more image (e.g., optical) sensors (e.g., one or more cameras 206), ultrasound sensors, depth sensors, IR/RGB cameras, PIR, heat IR, proximity sensors, radar, and/or tension sensors. The one or more sensors may be connected to the EVCS 100 or a computer system associated with the EVCS 100 via wired or wireless connections such as via a Wi-Fi connection or Bluetooth connection.

In some implementations, the housing 202 includes one or more lights configured to provide predetermined illumination patterns indicating a status of the EVCS 100. In some implementations, at least one of the one or more lights is configured to illuminate an area proximal to the EVCS 100 as a person approaches the area (e.g., a driver returning to a vehicle or a passenger exiting a vehicle that is parked in a parking spot associated with the EVCS 100).

In some implementations, the housing 202 includes one or more cameras 206 configured to capture one or more images of an area proximal to the EVCS 100. In some implementations, the one or more cameras 206 are configured to obtain video of an area proximal to the EVCS 100. For example, a camera may be configured to obtain a video or capture images of an area corresponding to a parking spot associated with the EVCS 100. In another example, another camera may be configured to obtain a video or capture images of an area corresponding to a parking spot next to the parking spot of the EVCS 100. In a third example, the camera 206 may be a wide angle camera or a 360° camera that is configured to obtain a video or capture images of a large area proximal to the EVCS 100, including a parking spot of the EVCS 100. As shown in FIG. 2B, the one or more cameras 206 may be mounted directly on a housing 202 of the EVCS 100 and may have a physical (e.g., electrical, wired) connection to the EVCS 100 or a computer system associated with the EVCS 100. Alternatively, as shown in FIG. 2C, the one or more cameras 206 (or other sensors) may be disposed separately from but proximal to the housing 202 of the EVCS 100. In some implementations, the camera 206 may be positioned at different locations on the EVCS 100 than what is shown in the figures. Further, in some implementations, the one or more cameras 206 include a plurality of cameras positioned at different locations on the EVCS 100.

Figure 3:
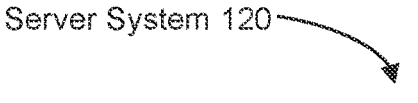
FIG. 3 is a block diagram of a server system in accordance with some implementations.
Figure 3:
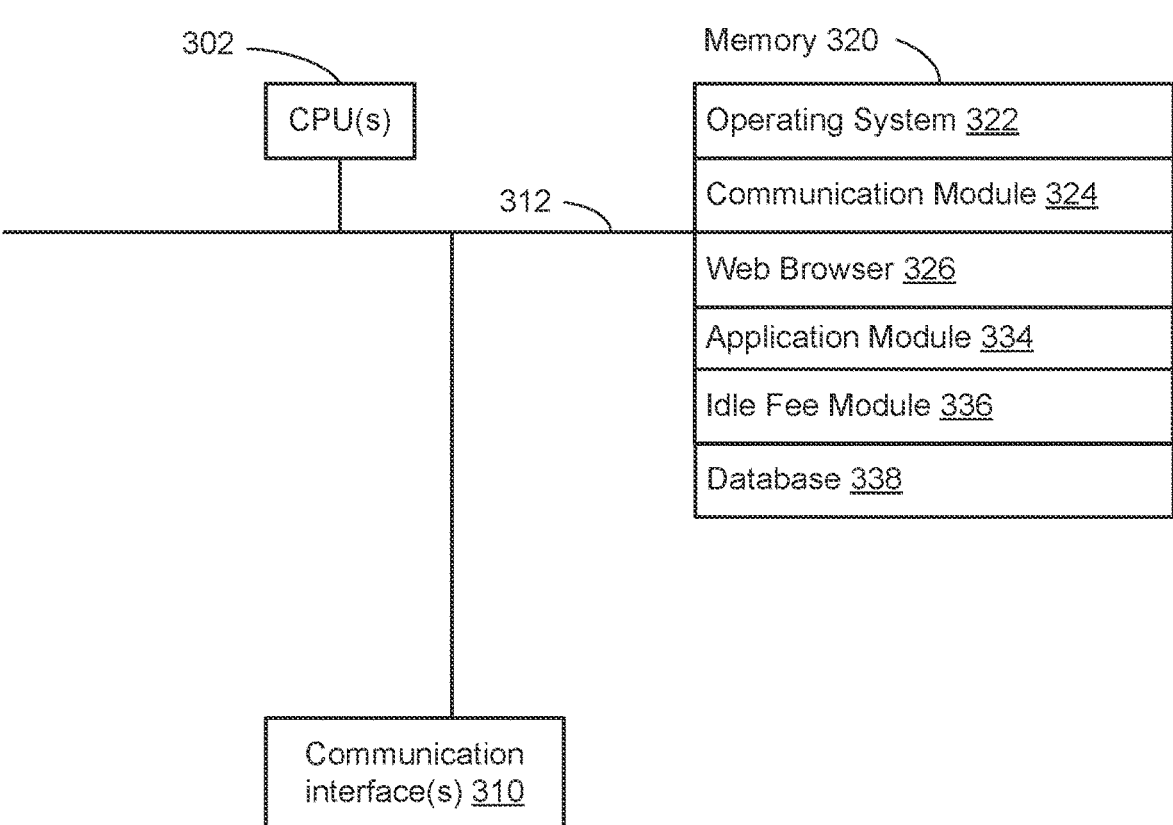

FIG. 3 is a block diagram of a server system 120, in accordance with some implementations. Server system 120 may include one or more computer systems (e.g., computing devices), such as a desktop computer, a laptop computer, and a tablet computer. In some implementations, the server system 120 is a data server that hosts one or more databases (e.g., databases of images or videos), models, or modules or may provide various executable applications or modules. The server system 120 includes one or more processing units (processors or cores, CPU(s)) 302, one or more network or other communications network interfaces 310, memory 320, and one or more communication buses 312 for interconnecting these components. The communication buses 312 optionally include circuitry (sometimes called a chipset) that interconnects and controls communications between system components.

The memory 320 includes high-speed random-access memory, such as DRAM, SRAM, DDR RAM, or other random-access solid-state memory devices, and may include non-volatile memory, such as one or more magnetic disk storage devices, optical disk storage devices, flash memory devices, or other non-volatile solid-state storage devices. In some implementations, the memory 320 includes one or more storage devices remotely located from the one or more processing units 302. The memory 320, or alternatively the non-volatile memory devices within the memory 320, includes a non-transitory computer-readable storage medium. In some implementations, the memory 320 or the computer-readable storage medium of the memory 320 stores the following programs, modules, and data structures, or a subset or superset thereof:

an operating system 322, which includes procedures for handling various basic system services and for performing hardware dependent tasks;

a communications module 324, which is used for connecting the server system 120 to other computers and devices via the one or more communication network interfaces 310 (wired or wireless), such as the internet, other wide area networks, local area networks, metropolitan area networks, and so on;

a web browser 326 (or other application capable of displaying web pages), which enables a user to communicate over a network with remote computers or devices;

an application module 334 for providing services to EVCS mobile application 538 (FIG. 5), including responding to requests for available charging stations, identifying (e.g., in database 338) retail outlets that are co-located with electric vehicle charging stations, transmitting instructions to EVCS mobile application 538 to display indications of available charging stations, together with representations of the co-located retail outlets, and so forth;

an idle fee module 336 for providing data on an idle fee associated with leaving a vehicle at an electric vehicle charging station beyond a threshold. In some embodiments idle fee module 336 stores data related to charge start time, charge expiration time, an idle time (e.g., an amount of time in excess of the threshold), and fees associated with idle time. For example, if the charge time of a vehicle expired at 3:30 PM and a vehicle has an idle time of 30 minutes, idle fee module may store data related to this as well as the fee associated with the idle time of 30 minutes.

database 338 for storing information on electric vehicle charging stations, their availability, retail outlets that are co-located with said electric vehicle charging stations, and so forth.

Each of the above identified executable modules, applications, or sets of procedures may be stored in one or more of the previously mentioned memory devices and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 320 stores a subset of the modules and data structures identified above. Furthermore, the memory 320 may store additional modules or data structures not described above.

Although FIG. 3 shows a server system 120, FIG. 3 is intended more as a functional description of the various features that may be present rather than as a structural schematic of the implementations described herein. In practice, and as recognized by those of ordinary skill in the art, items shown separately could be combined and some items could be separated.

Figure 4:
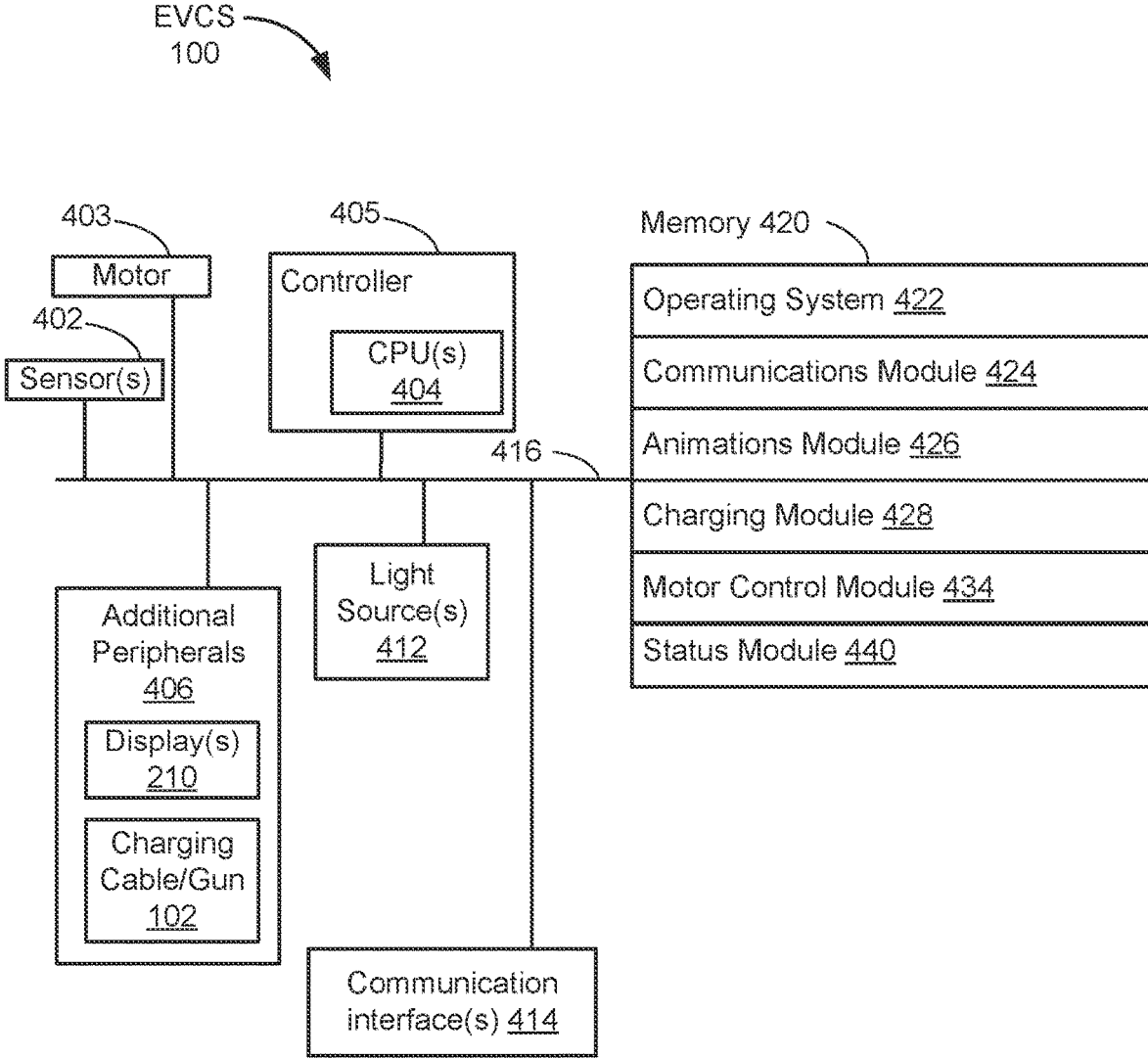
FIG. 4 is a block diagram of a charging station for an electric vehicle in accordance with some implementations.

FIG. 4 is a block diagram of an EVCS 100 (FIGS. 1 and 2A-2C) for charging an electric vehicle, in accordance with some implementations. The EVCS 100 optionally includes a motor 403 (configured to retract a portion of a charging cable), a controller 405 that includes one or more processing units (processors or cores) 404, one or more network or other communications network interfaces 414, memory 420, one or more light sources 412, one or more sensors 402, additional peripherals 406, and one or more communication buses 416 for interconnecting these components. The communication buses 416 optionally include circuitry (sometimes called a chipset) that interconnects and controls communications between system components. In some implementations, the memory 420 stores instructions for performing (by the one or more processing units 404) a set of operations, including determining a status of the EVCS 100, wherein the status indicates a state of an electric vehicle 110 at the charging station.

EVCS 100 typically includes additional peripherals 406 such as displays 210 for displaying content, and charging cable 102. In some implementations, the displays 210 may be touch-sensitive displays that are configured to detect various swipe gestures (e.g., continuous gestures in vertical and/or horizontal directions) and/or other gestures (e.g., a single or double tap) or to detect user input via a soft keyboard that is displayed when keyboard entry is needed.

The user interface may also include one or more sensors 402 such as cameras (e.g., camera 206, described above with respect to FIGS. 2A-2B), ultrasound sensors, depth sensors, infrared cameras, visible (e.g., RGB or black and white) cameras, passive infrared sensors, heat detectors, infrared sensors, proximity sensors, or radar. In some implementations, the one or more sensors 402 are for detecting whether external objects are within a predefined region proximal to the housing, such as living and nonliving objects, and/or the status of the EVCS 100 (e.g., available, occupied, etc.) in order to perform an operation, such as retracting the charging cable safely and carefully.

The memory 420 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. In some implementations, the memory 420 includes one or more storage devices remotely located from the processing units 404, such as database 338 of server system 120 that is in communication with the EVCS 100. The memory 420, or alternatively the non-volatile memory devices within the memory 420, includes a non-transitory computer-readable storage medium. In some implementations, the memory 420 or the computer-readable storage medium of the memory 420 stores the following programs, modules, and data structures, or a subset or superset thereof:

> an operating system 422, which includes procedures for handling various basic system services and for performing hardware dependent tasks;
>
> a communications module 424, which is used for connecting the EVCS 100 to other computers and devices via the one or more communication network interfaces 414 (wired or wireless), such as the internet, other wide area networks, local area networks, metropolitan area networks, and so on;
>
> an animations module 426 for animating the one or more light sources 412 to provide predetermined illumination patterns or to provide illumination for passersby and users of the EVCS 100;
>
> a charging module 428 for charging an electric vehicle (e.g., measuring how much charge has been delivered to an electric vehicle, commencing charging, ceasing charging, etc.);
>
> motor control module 434 that includes one or more instructions for energizing or forgoing energizing the motor; and
>
> a status module 440 for monitoring a charging status of the EVCS 100 (e.g., a status of the EVCS 100 with respect to charging of an electric vehicle or its ability/ inability to charge an electric vehicle).

In some implementations, the memory 420 stores metrics, thresholds, and other criteria, which are compared against the measurements captured by the one or more sensors 402. For example, data obtained from a PIR sensor of the one or more sensors 402 can be compared with baseline data to detect that an object is in proximity the EVCS 100.

Each of the above identified executable modules, applications, or sets of procedures may be stored in one or more of the previously mentioned memory devices and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 420 stores a subset of the modules and data structures identified above. Furthermore, the memory 420 may store additional modules or data structures not described above.

Although FIG. 4 shows an EVCS 100, FIG. 4 is intended more as a functional description of the various features that may be present rather than as a structural schematic of the implementations described herein. In practice, and as recognized by those of ordinary skill in the art, items shown separately could be combined and some items could be separated.

Figure 5:
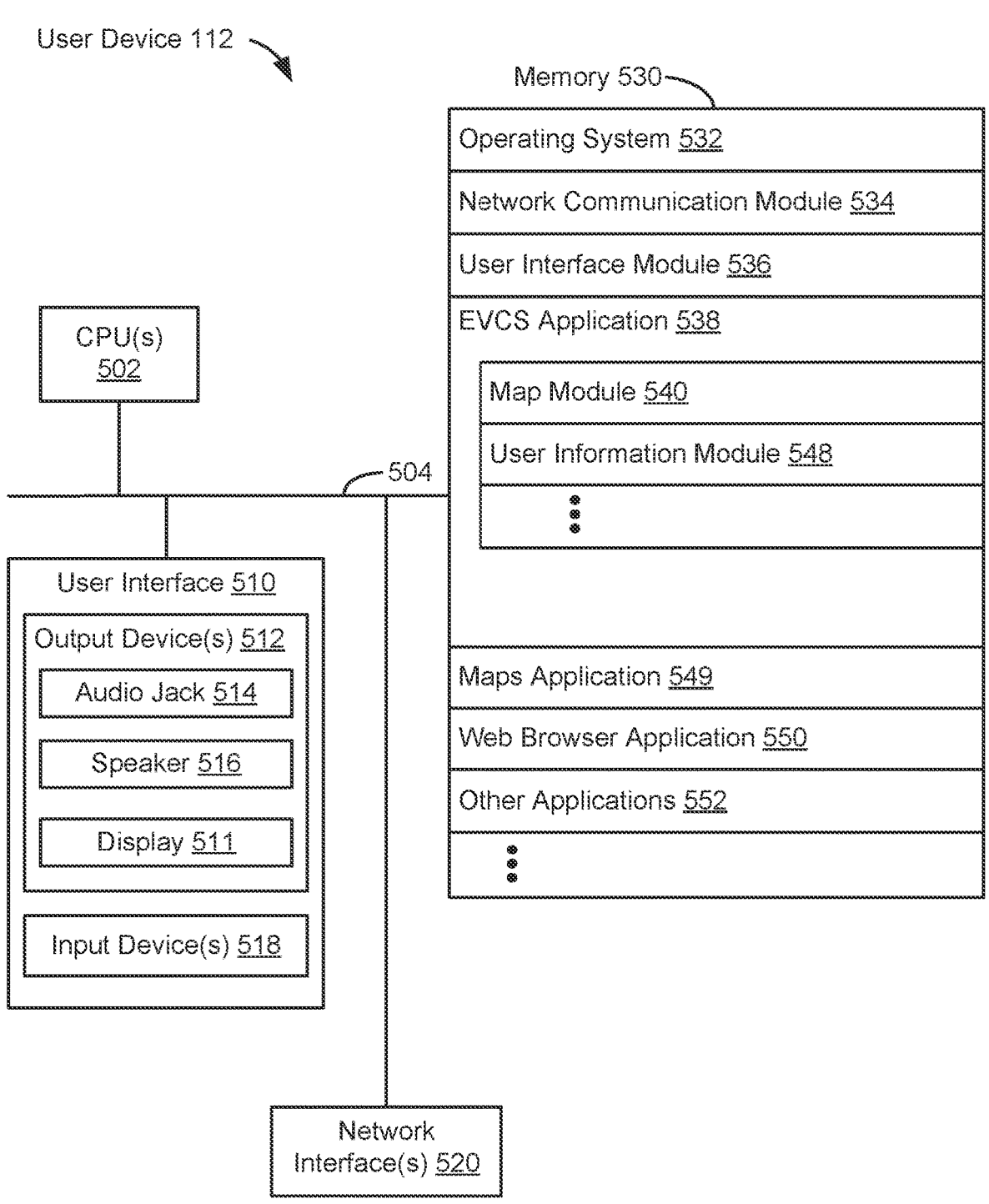
FIG. 5 is a block diagram of a user device in accordance with some implementations.

FIG. 5 is a block diagram of a user device 112 of a user 114 in accordance with some implementations. In some implementations, the user 114 is associated with (e.g., an operator of) an electric vehicle 110 at EVCS 100. Various examples of the computing device 112 include a cellular-capable smart device such as a smartphone, a smart watch, a laptop computer, a tablet computer, and other computing devices that have a processor capable of connecting to the EVCS 100 via a communications network (e.g., network 122).

The user device 112 typically includes one or more processing units (processors or cores) 502, one or more network or other communications network interfaces 520, memory 530, and one or more communication buses 504 for interconnecting these components. The communication buses 504 optionally include circuitry (sometimes called a chipset) that interconnects and controls communications between system components. The user device 112 typically includes a user interface 510. The user interface 510 typically includes one or more output devices 512 such as an audio output device 514, such as speakers 516 or an audio output connection (e.g., audio jack) for connecting to speakers, earphones, or headphones. The user interface 510 also typically includes a display 511 (e.g., a screen or monitor). In some implementations, the user device 112 includes input devices 518 such as a keyboard, mouse, and/or other input buttons. Alternatively or in addition, in some implementations, the user device 112 includes a touch-sensitive surface. In some embodiments, the touch-sensitive surface is combined with the display 511, in which case the display 511 is a touch-sensitive display. In some implementations, the touch-sensitive surface is configured to detect various swipe gestures (e.g., continuous gestures in vertical and/or horizontal directions) and/or other gestures (e.g., single/double tap). In computing devices that have a touch-sensitive surface (e.g., a touch-sensitive display), a physical keyboard is optional (e.g., a soft keyboard may be displayed when keyboard entry is needed). Furthermore, user device 112 may also include a microphone and voice recognition software to supplement or replace the keyboard.

The memory 530 includes high-speed random-access memory, such as DRAM, SRAM, DDR RAM, or other random-access solid-state memory devices, and may include non-volatile memory, such as one or more magnetic disk storage devices, optical disk storage devices, flash memory devices, or other non-volatile solid-state storage devices. In some implementations, the memory 530 includes one or more storage devices remotely located from the processing units 502. The memory 530, or alternatively the non-volatile memory devices within the memory 530, includes a non-transitory computer-readable storage medium. In some implementations, the memory 530 or the computer-readable storage medium of the memory 530 stores the following programs, modules, and data structures, or a subset or superset thereof:

> an operating system 532, which includes procedures for handling various basic system services and for performing hardware dependent tasks;
>
> a network communication module 534, which is used for connecting the user device 112 to other computers and devices via the one or more communication network interfaces 520 (wired or wireless), such as the internet, other wide area networks, local area networks, metropolitan area networks, and so on;

a user interface module 536 for providing user interfaces for the user to interact with the user device 112 via applications on the user device 112 and the operating system 532 of the user device 112;

an EVCS mobile application 538 for communicating with an EVCS 100 or a server system that supports the EVCS 100. In some embodiments, EVCS mobile application 538 is capable of displaying a map of nearby electric vehicle charging stations (using a map module 540). As described below, in some embodiments, the map displays indications of nearby electric vehicle charging stations, in which the indications include representations of co-located retail outlets;

user information module 548 for providing an idle fee module 336 to a user;

a maps application 549 for providing turn-by-turn driving directions to a user;

a web browser application 550 for accessing the internet and accessing websites on the internet, including providing functionalities on the EVCS mobile application 538 via a website accessed through web browser application 550; and other applications 552 that the user 114 may have installed on the user device 112 or that may have been included as default applications on the user device 112.

Each of the above identified executable modules, applications, or sets of procedures may be stored in one or more of the previously mentioned memory devices and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 530 stores a subset of the modules and data structures identified above. Furthermore, the memory 530 may store additional modules or data structures not described above.

Although FIG. 5 shows a user device 112, FIG. 5 is intended more as a functional description of the various features that may be present rather than as a structural schematic of the implementations described herein. In practice, and as recognized by those of ordinary skill in the art, items shown separately could be combined and some items could be separated.

Figure 6A:
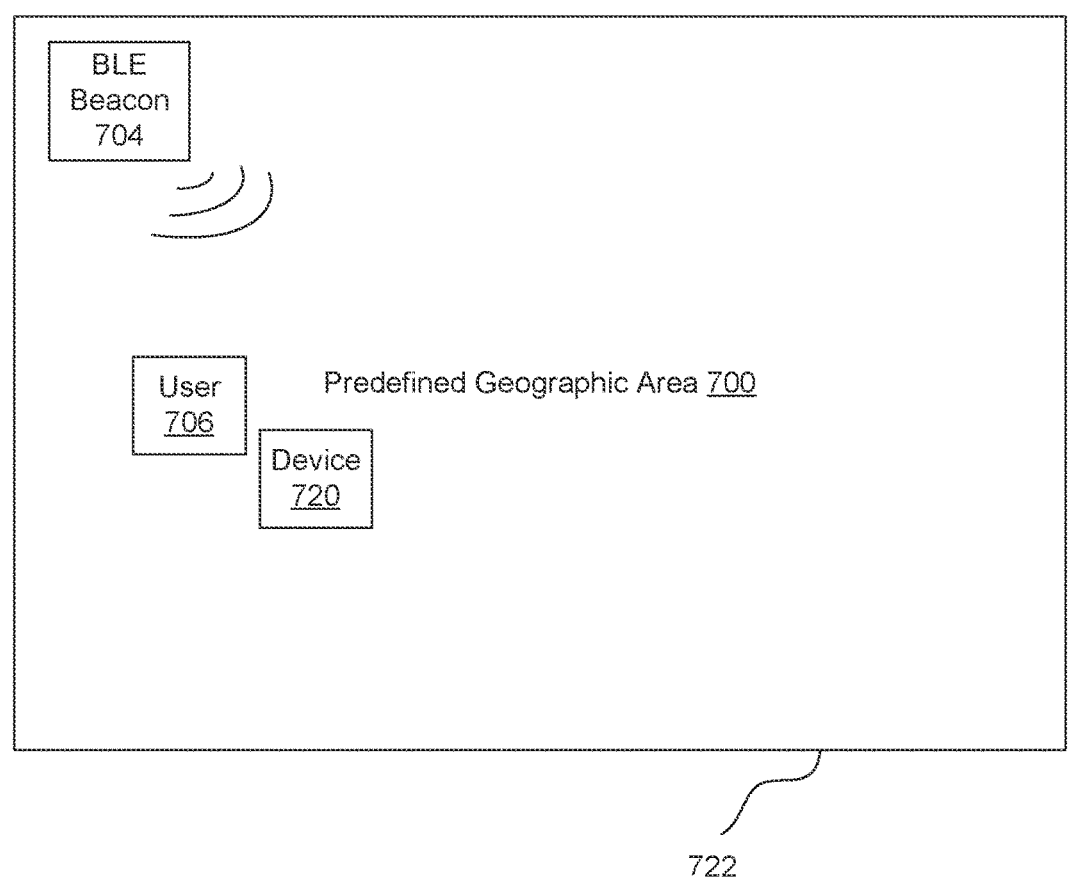
FIG. 6A is a block diagram illustrating an example scenario in which a threshold for incurring idle fees for charging an electric vehicle may be extended, in accordance with some implementations.
Figure 6A:
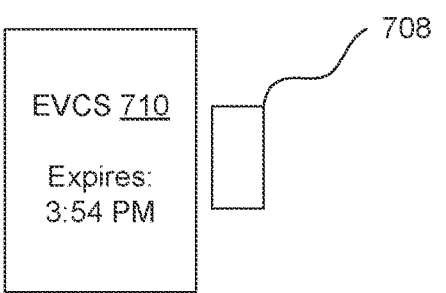

FIG. 6A is a block diagram illustrating an example scenario in which a threshold for incurring idle fees for charging an electric vehicle may be extended, in accordance with some implementations (FIG. 6A is not drawn to scale). As illustrated, user 706 may park their electric vehicle 708 in a bay of EVCS 710, where EVCS 710 is configured to provide an electric charge to vehicle 708 via one or more electrical connections. User 706 may proceed to log into their EVCS user account and plug in vehicle 708 into the EVCS 710, which may initiate charging vehicle 708. In some embodiments, in response to the user plugging in vehicle 708 into the EVCS 710, information is exchanged between the vehicle 708 and the EVCS 710 that identifies the user of the vehicle 708.

In some circumstances, the user 708 may be allotted a threshold amount of time or charge for charging the electric vehicle 708 (referred to as a charging parameter threshold), beyond which idle fees are incurred. Information about this threshold and/or the idle fees are conveyed by the server system 120 to the user's device 720. For example, the server system 120 may indicate (e.g. via a notification sent to the user's device 720) an expiration time of 3:54 PM for charging vehicle 708, after which user 706 may be penalized for not disconnecting vehicle 708 from EVCS 710 (e.g., late fees may be incurred by user 706). In some embodiments, EVCS 710 will provide a predefined amount of power (e.g., a predefined number of kilowatt-hours) before idle fees are incurred by user 706 (unless increased as described below).

Once the user 706 has logged into the EVCS 710 and the vehicle 708 has initiated charging, the charging parameter threshold may be extended based on a determination that the user 706 may enter a predefined geographic area 700 (e.g., a retail store that has provided the electric vehicle charging station) Server system 120 may determine that the user is located within the predefined geographic area 700 in a number of different ways. In some embodiments, when the device 720 is within proximity to the BLE beacon signal 704, the user's device 720 receives the BLE beacon signal 704 and passes the BLE beacon signal 704 to the server system 120, which performs a look-up of the BLE beacon signal to determine the location of the user's device 720. In another embodiment, determining whether the user 706 is in the predefined geographic area 700 comprises determining whether geofence 722 at the predefined geographic area 700 has been crossed (e.g., the user device is associated with a GPS and when the GPS is determined as crossing a geofence, it is determined that the user 706 is in a predefined geographic area). Geofence 722 may be the perimeter around predefined geographic area. In some embodiments, the user 706 is associated with a credit card or other user account and when the user 706 makes a purchase, it is determined that the user 706 is located within the predefined geographic area 700. In some embodiments, determining the user 706 is in the predefined geographic area 700 comprises tracking the user 706 using a camera on the EVCS 710 (e.g. tracking that the user has left the vicinity of the EVCS and entered the retail store).

FIG. 6B illustrates a user notification 723 on a user interface of a device 720 for indicating an increase in the charging parameter threshold, based on a determination that the user 706 has entered the predefined geographic area, in accordance with some implementations. Once server system 120 determines that the user 706 is located within the predefined geographic area 700, server system 120 may increase the charging parameter threshold from a first charging parameter threshold value to a second charging parameter threshold value of 4:54 PM. The user device 720 may receive notification 723 indicating that the charging parameter threshold has increased by 60 minutes, depicting the new charging parameter threshold as 4:54 PM. User 706 now has an additional 60 minutes before having to move their vehicle 708 from the bay of the EVCS 710.

In some embodiments, the charging parameter threshold is increased automatically, without user 706's input or request, in response to the determination that the user 706 is located within a predefined geographic area 700. In some embodiments, the charging parameter threshold is increased by an amount that is based on an identification of the specific type of predefined geographic area 700. For example, retail stores may increase the charging parameter threshold by 60 minutes whereas other partner stores such as gas stations may increase the charging parameter threshold by 20 minutes.

FIGS. 7A-7D illustrate a flowchart of a method 1000 of charging a vehicle at an EVCS. In some embodiments, the method 1000 is performed at a server system with one or more processors and memory (e.g., server system 120, FIG.

2). In some embodiments, the method 1000 is performed by an electric vehicle charging station (e.g., EVCS 710, FIG. 7).

The method 1000 comprises determining (1002) that a vehicle (e.g., vehicle 708) is occupying a bay of an electric vehicle charging station (e.g., EVCS 710).

In some embodiments, determining that the vehicle is occupying the bay of the EVCS includes detecting that the vehicle is charging using the EVCS. In some embodiments, determining that the vehicle is occupying the bay of the EVCS includes determining that a charging connector (e.g., a charge gun) is connected to the vehicle. In some embodiments, determining that the vehicle is occupying the bay of the EVCS includes detecting that the vehicle has initiated charging of the vehicle using the EVCS (e.g., by connecting the vehicle to the EVCS, initiating a charging process through a user interface of the EVCS, initiating a charging process through a mobile application associated with the EVCS, etc.). In some embodiments, determining that the vehicle is occupying the bay of the EVCS includes detecting the vehicle using one or more sensors of the EVCS (e.g., a camera).

The method 1000 further includes identifying (1004) a user associated with the vehicle.

In some embodiments, identifying (1006) the user comprises identifying a user device of the user (for example, identifying a mobile device associated with the user using a check-in process when the user initiates charging at the EVCS).

In some embodiments, the user associated with the vehicle is a driver of the vehicle. In some embodiments, the user associated with the vehicle is identified during a process of initiating charging of the vehicle using the EVCS (e.g., by identifying the vehicle through a charging connector and then performing a look-up to determine a user associated with the vehicle). For example, in response to the user plugging in the vehicle, information is exchanged between the vehicle and the EVCS that identifies the user or the vehicle (e.g., through the charge port). In some embodiments, the information exchanged between the vehicle and the EVCS is passed to the server system, which associates the information with the user. In some embodiments, information that identifies the user is exchanged between the mobile device of the user and the server system (e.g., through a user check-in process on a mobile application or automatically, without user intervention, in response to determining that the user's mobile device is near the EVCS). In some embodiments, information is exchanged through both pathways (e.g., through the charge port of the EVCS and through the mobile device). In some embodiments, the user initiates charging of the vehicle using a user interface of the EVCS, and the user is identified based on information input by the user through the user interface of the EVCS.

The method 1000 includes allotting (1008) a charging parameter threshold for charging the vehicle. In some embodiments, the charging parameter threshold is a threshold against which a charging parameter is measured (e.g., a length of time that the vehicle has remained in the bay or has been charging using the EVCS, or an amount of charging received by the vehicle). For example, in some embodiments, the charging parameter threshold is a fixed length of time that the vehicle may charge, remain in the bay, or remain connected to the EVCS without penalty, an amount of power that the user may receive without penalty, a percentage charge that the user may receive without penalty, etc. In some embodiments, the penalty is a late or idle fee. In some embodiments, the method includes monitoring the charging parameter over time.

In some embodiments, the charging parameter threshold comprises a predefined time threshold during which the vehicle is (1010) allowed to occupy the bay of the EVCS (e.g., the method includes assigning a predetermined amount of time for occupying the bay).

In some embodiments, the charging parameter threshold comprises (1012) a predefined amount of charge of the vehicle. For example, the charging parameter threshold may comprise a predefined percentage charge (e.g., the vehicle may complete its charge to 100% capacity (or 50% or 80% capacity)), after which idle fees are typically incurred (unless increased as described below in operation 1034). As another example, the EVCS will provide a predefined amount of power (e.g., a predefined number of kilowatt-hours) before idle fees are incurred (unless increased as described below in operation 1034).

The method (1000) further includes determining (1014) that the user is located within a predefined geographic area. In some embodiments, the predefined location does not include the bay of the EVCS.

In some embodiments, determining whether the user is in the predefined geographic area comprises using (1016) background indoor tracking. For example, using ultra-wide-band technology, transmitters on the device may send a signal to anchors positioned on the predefined geographic area, which then receive these signals and send them to a server that calculates the accurate position of the transmitters in real-time.

In some embodiments, determining whether the user is in the predefined geographic area comprises determining (1018) whether a geofence at the predefined geographic area has been crossed (e.g., the users location is associated with a GPS and when the GPS is determined as crossing a geofence, it is determined that the user is in the predefined geographic area). For example, in accordance with a determination that the user (or user's device) crosses the geofence, the user is determined to have entered the predefined geographic area 700. After determining that the user has entered the predefined geographic area, in accordance with a determination that the user crosses the geofence again, the user is determined to have left the geographic area.

In some embodiments, determining whether the user is in the predefined geographic area comprises determining (1020) whether a device associated with a user has detected a signal from a wireless (e.g., Wi-Fi) access point that is transmitted from within the predefined geographic area.

In some embodiments, determining whether the user is in the predefined geographic area 700 comprises determining (1022) whether a device associated with the user has detected a signal from a BLE beacon that is located within the predefined geographic area. For example, when the user's device is within proximity to the BLE beacon signal, the user's device receives the BLE beacon signal and passes the BLE beacon signal to the server system, which performs a look-up to determine the location of the user's device.

In some embodiments, determining whether the user is in the predefined geographic area comprises determining (1024), using a store purchase system, whether the user has completed a transaction within the predefined geographic area (e.g., a credit card purchase). For example, the user is associated with a credit card or other user account and when the user makes a purchase, it is determined that the user is located within the geographic area (e.g., wherein the geographic area is a store).

In some embodiments, determining whether the user is in the predefined geographic area comprises tracking (1026)

the user (e.g., physically tracking the user into the predefined area) (e.g. tracking that the user has left the vicinity of the EVCS and entered the retail store).

In some embodiments, the predefined geographic area is (1028) associated with a site-partner of the EVCS. In some embodiments, the geographic area may be an area in which the site-partner is located. For example, the site-partner is a store (e.g., a retail, or brick-and-mortar store) and the geographic area is an area in which the store is located.

The method (1000) further includes in accordance with a determination that the user is located within the predefined geographic area, increasing (1030) the charging parameter threshold from a first charging parameter threshold value to a second charging parameter threshold value. In some embodiments, the charging parameter threshold is increased automatically, without user input or request in response to the determination. In some embodiments, the method includes notifying the user that the charging parameter threshold has been increased (e.g., notifying the user, via the user's device, that they have more time before incurring idle fees).

In some embodiments, the method includes, while the vehicle is occupying the bay of the EVCS, determining (1032) that the vehicle has satisfied extension criteria. The charging parameter threshold is increased in accordance with a determination that the vehicle has the satisfied extension criteria (e.g., the extension criteria comprise one or more requirements for extending the charging parameter threshold that are distinct from and/or augment the requirement that the user be within the predefined geographic area). In some embodiments, the charging parameter threshold is increased in accordance with a determination that the extension criteria are met concurrently with the user being within the predefined geographic area. In some embodiments, the extension criteria include a requirement that the charging parameter is near the charging parameter threshold. In some embodiments, the extension criteria include a requirement that the charging parameter has met or exceeded the charging parameter threshold. In some embodiments, the charging parameter threshold is increased in accordance with a determination that the user is located within the predefined geographic area concurrently with the extension criteria being met. For example, the extension criteria include a requirement that the vehicle has been in the bay for a threshold amount of time (e.g., 5 minutes), which gives the user 5 minutes to get inside the predefined geographic area (e.g., a particular store). In some embodiments, the extension criteria include a requirement that the vehicle is within a second threshold of the charging parameter threshold (e.g., the allotment is increase when the user is in the predefined geographic area with 5 minutes of charging remaining). In some embodiments, the method includes, in accordance with a determination that the vehicle has not satisfied extension criteria and/or that the user has not entered the predefined geographic area, sending a notification to the user indicating (e.g., warning) the user that they will soon begin incurring late fees.

In some embodiments, the charging parameter threshold is increased (1034) by an amount that is based on an identification of the predefined geographic area (e.g., based on the type of business, as coffee shops may want to allow patrons to occupy nearby EVCS stalls for longer than grocery stores). In some embodiments, the method further comprises performing a lookup to identify the predefined geographic area. (e.g., a lookup of the type of business, e.g., grocery store, coffee shop, mall, etc.).

The method (1000), further comprising, transmitting (1036), to the user, an alert indicating that the charging parameter threshold has increased. In some embodiments, the alert indicates (e.g., displays) a new charging parameter threshold. For example, the user now has an additional 30 minutes before having to move their vehicle from the bay of the EVCS.

In some embodiments, the method includes, in accordance with a determination that the user is not located within the predefined geographic area, maintaining (1038) the charging parameter threshold. In some embodiments this may include, penalizing the user in response to the user exceeding the charging parameter threshold. In some embodiments, the method includes notifying the user when the charging parameter is near the charging parameter threshold. In some embodiments, the method includes notifying the user of a punitive measure (late or idle fees) should the vehicle not be moved before the charging parameter threshold has been met.

In some embodiments, after increasing the charging parameter threshold: determining (1040) that the vehicle has satisfied second extension criteria; determining that the user continues to be located within the predefined geographic area. The method further includes, in accordance with a determination that the user continues to be located within the predefined geographic area and that the vehicle satisfies the second extension criteria, increasing the charging parameter threshold from the second charging parameter threshold value to a third charging parameter threshold value (e.g., after adjusting the amount of extra time the user has, adjusting it again, potentially allowing for multiple extensions of grace period). In some embodiments, this second adjustment is based on the geographic area (e.g., certain site-partners or types of site-partners, such as stores, will provide another increase, whereas other site-partners will not provide an additional increase, such as a coffee shop (where a person can loiter)).

It will be understood that, although the terms first, second, etc., are, in some instances, used herein to describe various elements, these elements should not be limited by these terms. These terms are only used to distinguish one element from another. For example, a first widget could be termed a second widget, and, similarly, a second widget could be termed a first widget, without departing from the scope of the various described implementations. The first widget and the second widget are both widget, but they are not the same condition unless explicitly stated as such.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising." when used in this specification, specify the presence of stated features, integers, steps, operations, elements, and/or components, but do not preclude the presence or addition of one or more other features, integers, steps, operations, elements, components, and/or groups thereof.

The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. A method, comprising:

determining that a vehicle is occupying a bay of an electric vehicle charging station (EVCS);

identifying a user associated with the vehicle;

allotting a predefined time threshold during which the vehicle is allowed to occupy the bay of the EVCS;

during the predefined time during which the vehicle is allowed to occupy the bay of the EVCS, charging, by the EVCS, the vehicle;

determining whether a device associated with the user has detected a signal from a BLE beacon that is located within a predefined geographic area; and in accordance with a determination that the device associated with the user has detected a signal from a BLE beacon that is located within the predefined geographic area, increasing the predefined time threshold from a first predefined time threshold value to a second predefined time threshold value; and transmitting, to the user, an alert indicating that the predefined time threshold has increased.

2. The method of claim 1, further comprising, while the vehicle is occupying the bay of the EVCS, determining that the vehicle has satisfied extension criteria, wherein the predefined time threshold is increased in accordance with a determination that the vehicle has satisfied extension criteria.

3. The method of claim 1, wherein identifying the user comprises identifying a user device of the user.

4. The method of claim 1, further comprising, in accordance with a determination that the user is not located within the predefined geographic area, maintaining the predefined time threshold.

5. The method of claim 1, further comprising determining whether the user is in the predefined geographic area using background indoor tracking.

6. The method of claim 1, further comprising determining whether the user is in the predefined geographic area by determining whether a geofence at the predefined geographic area has been crossed.

7. The method of claim 1, further comprising determining whether the user is in the predefined geographic area by determining whether a device associated with a user has detected a signal from a wireless access point that is transmitted from within the predefined geographic area.

8. The method of claim 1, determining whether the user is in the predefined geographic area by determining, using a store purchase system, whether the user has completed a transaction within the predefined geographic area.

9. The method of claim 1, wherein determining whether the user is in the predefined geographic area comprises tracking the user.

10. The method of claim 1, wherein the predefined geographic area is associated with a site-partner of the EVCS.

11. The method of claim 1, further comprising, after increasing the predefined time threshold:

determining that the vehicle has satisfied second extension criteria;

determining that the user continues to be located within the predefined geographic area;

in accordance with a determination that the user continues to be located within the predefined geographic area and that the vehicle satisfies the second extension criteria, increasing the predefined time threshold from the second predefined time threshold value to a third predefined time threshold value.

12. A system for charging a vehicle at an electric vehicle charging station, comprising:

one or more processors;

memory storing one or more programs, wherein the one or more programs are configured for execution by the one or more processors and include instructions for:

determining that a vehicle is occupying a bay of an electric vehicle charging station (EVCS);

identifying a user associated with the vehicle;

allotting a predefined time threshold during which the vehicle is allowed to occupy the bay of the EVCS;

during the predefined time during which the vehicle is allowed to occupy the bay of the EVCS, charging, by the EVCS, the vehicle;

determining whether a device associated with the user has detected a signal from a BLE beacon that is located within a predefined geographic area; and in accordance with a determination that the device associated with the user has detected a signal from a BLE beacon that is located within the predefined geographic area, increasing the predefined time threshold from a first predefined time threshold value to a second predefined time threshold value; and transmitting, to the user, an alert indicating that the predefined time threshold has increased.

13. A non-transitory computer readable storage medium storing instructions, which, when executed by a system that includes one or more processors, causes the one or more processors to perform a set of operations, comprising:

determining that a vehicle is occupying a bay of an electric vehicle charging station (EVCS);

identifying a user associated with the vehicle;

allotting a predefined time threshold during which the vehicle is allowed to occupy the bay of the EVCS;

during the predefined time during which the vehicle is allowed to occupy the bay of the EVCS, charging, by the EVCS, the vehicle;

determining whether a device associated with the user has detected a signal from a BLE beacon that is located within a predefined geographic area; and in accordance with a determination that the device associated with the user has detected a signal from a BLE beacon that is located within the predefined geographic area, increasing the predefined time threshold from a first predefined time threshold value to a second predefined time threshold value; and transmitting, to the user, an alert indicating that the predefined time threshold has increased.

* * * * *